United States Patent
Niwa et al.

(10) Patent No.: US 7,793,631 B2
(45) Date of Patent: Sep. 14, 2010

(54) FUEL IGNITION SYSTEM, FUEL IGNITING METHOD, FUEL REFORMING SYSTEM AND FUEL REFORMING METHOD, FOR INTERNAL COMBUSTION ENGINE

(75) Inventors: Yusuke Niwa, Machida (JP); Masaharu Matsumoto, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 275 days.

(21) Appl. No.: 12/064,504

(22) PCT Filed: Aug. 21, 2006

(86) PCT No.: PCT/JP2006/316308

§ 371 (c)(1),
(2), (4) Date: Feb. 22, 2008

(87) PCT Pub. No.: WO2007/026558

PCT Pub. Date: Mar. 8, 2007

(65) Prior Publication Data

US 2009/0260592 A1    Oct. 22, 2009

(30) Foreign Application Priority Data

Aug. 30, 2005 (JP) ............................ 2005-248708
Aug. 30, 2005 (JP) ............................ 2005-249383

(51) Int. Cl.
*F02P 23/04* (2006.01)

(52) U.S. Cl. .................... 123/143 B; 123/668; 123/670

(58) Field of Classification Search ............. 123/143 B, 123/668, 670
See application file for complete search history.

(56) References Cited

U.S. PATENT DOCUMENTS

| | | | |
|---|---|---|---|
| 4,974,559 A | | 12/1990 | Nagaoka |
| 5,806,483 A | * | 9/1998 | Mitarai et al. ............... 123/299 |
| 7,188,470 B2 | * | 3/2007 | Bosteels ...................... 60/299 |
| 7,498,009 B2 | * | 3/2009 | Leach et al. ................. 423/235 |
| 2005/0227864 A1 | * | 10/2005 | Sutorik et al. ............... 502/304 |
| 2007/0193537 A1 | * | 8/2007 | Miyasaka ...................... 123/3 |
| 2008/0022962 A1 | * | 1/2008 | Fujiwara et al. .......... 123/193.6 |
| 2008/0116054 A1 | * | 5/2008 | Leach et al. ............. 204/157.3 |
| 2008/0258080 A1 | * | 10/2008 | Rippe Toe ............... 250/492.1 |

FOREIGN PATENT DOCUMENTS

| | | |
|---|---|---|
| JP | 58-195074 A | 11/1983 |
| JP | 58-180328 U | 12/1983 |
| JP | 63-173852 A | 7/1988 |
| JP | 2641551 B2 | 5/1997 |
| JP | 10-176615 A | 6/1998 |
| JP | 10-265783 A | 10/1998 |
| JP | 11-324879 A | 11/1999 |
| JP | 2000-073780 A | 3/2000 |
| JP | 2002-250231 A | 9/2002 |

\* cited by examiner

*Primary Examiner*—Erick Solis
(74) *Attorney, Agent, or Firm*—Foley & Lardner LLP

(57) ABSTRACT

A fuel ignition system for an internal combustion engine is disclosed. The fuel ignition system is adapted to allow a photocatalyst to ignite a mixture by using a light energy irradiated from a light generator. The fuel ignition system includes: a combustion chamber; the photocatalyst provided in the combustion chamber; and a light generator for flatly irradiating the light energy to the photocatalyst.

17 Claims, 12 Drawing Sheets

FIG. 4
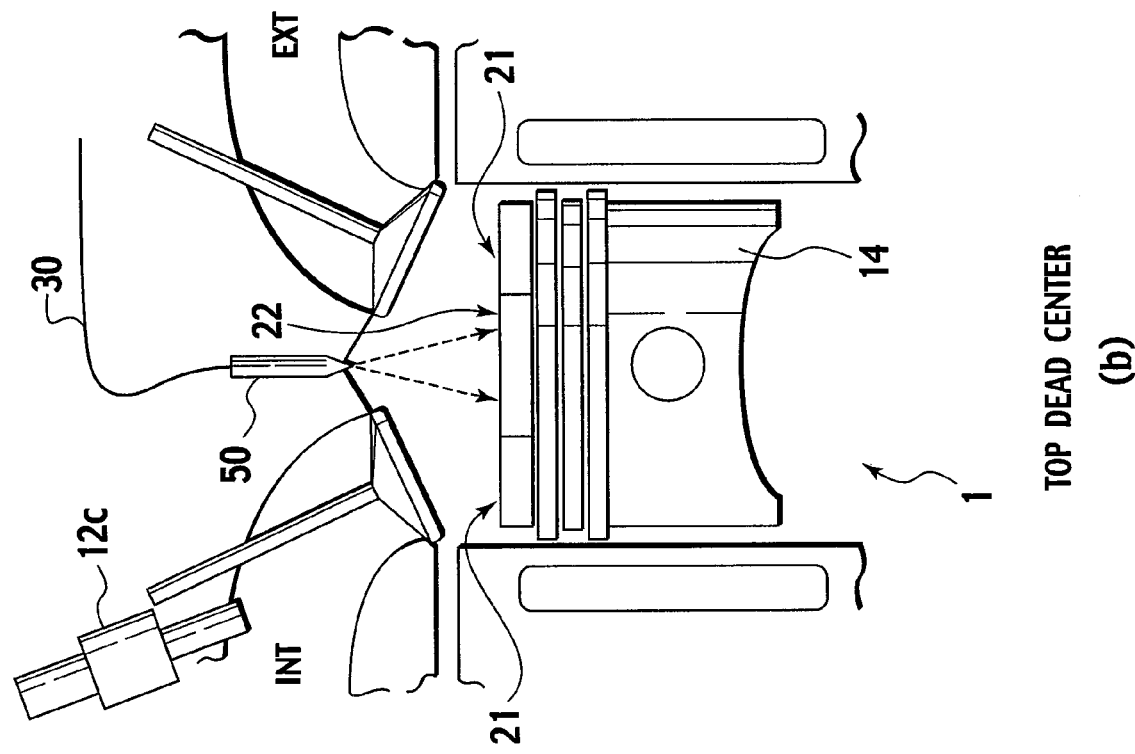
(b) TOP DEAD CENTER
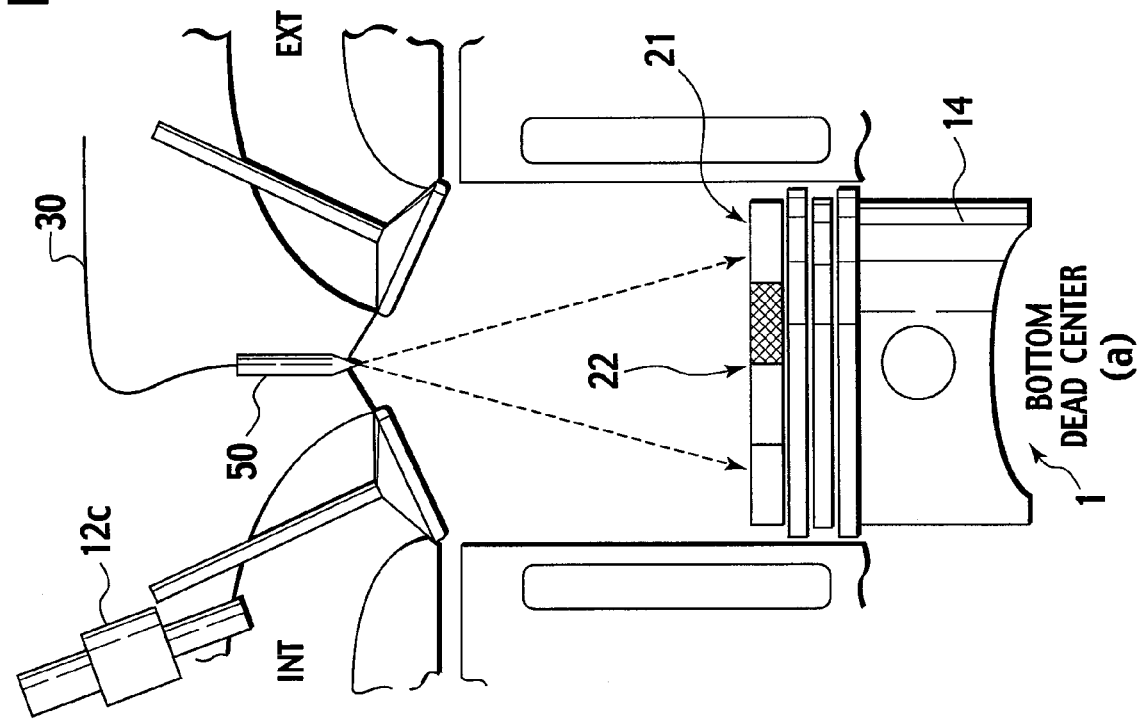
(a) BOTTOM DEAD CENTER (b) ENLARGED VIEW OF PISTON HEAD FACE 14a (a)

FUEL IGNITION SYSTEM, FUEL IGNITING METHOD, FUEL REFORMING SYSTEM AND FUEL REFORMING METHOD, FOR INTERNAL COMBUSTION ENGINE

TECHNICAL FIELD

The present invention relates to a fuel ignition system for internal combustion engine. More in detail, the present invention relates to the fuel ignition system for internal combustion engine which system allows a photocatalyst to ignite a mixture by means of a light energy irradiated from a light generator.

Moreover, the present invention relates to a fuel reforming system, a fuel reforming method, a fuel ignition system and a fuel igniting method which are used for internal combustion engine. More in detail, the present invention relates to the fuel reforming system, the fuel reforming method, the fuel ignition system and the fuel igniting method for internal combustion engine which are capable of suppressing generation of PM (particulate matter) by means of a slow oxidation of a photocatalyst.

BACKGROUND ART

For improving fuel economy, improving a heat efficiency is raised as one method. Note that, for improving a net heat efficiency, increasing compression ratio of mixture, leaning of mixture and the like are raised for example.

In the case of the leaning of mixture; the more leaned the mixture is, the less stabilized the combustion is. For stabilizing the combustion, the following operations are taken: Increasing flame propagation speed by causing a strong gas flow such as swirl, tumble and the like to an area in the combustion chamber to thereby shorten the combustion period.

Moreover, in the case of an ignition plug as well; for securing a stabilized ignition, an electrode discharge part is rendered to have a smaller diameter and an iridium for improving wear-proof is used.

Moreover, a multiple-point ignition is used for shortening a flame propagation distance, to thereby stabilize the combustion.

Moreover, Japanese Patent Application Laid-Open No. Showa 58 (1983)-195071 and Japanese Patent Application Laid-Open No. Showa 63 (1988)-173852 each disclose a multiple-point ignition, and report a technology using a laser, instead of a conventional ignition plug, which laser is capable of making a stable ignition even in a state of a strong gas flow.

Moreover, the laser igniting method can arbitrarily set ignition positions. Therefore, in this respect, the laser igniting method is capable of making the multiple-point ignition. Moreover, the laser has features not found in any other ignition system(s), i.e., spending a very short time for ending ignition, specifically, the time required for the ignition is tens of nano seconds (about one thousand nano seconds according to the conventional ignition plug).

As such, the laser igniting method having the above features can improve combustion of mixture to a great extent.

For example, in a combustion chamber of an automobile engine, increasing the compression ratio of mixture, as the case may be, involves a knocking. In this case, however, varying ignition positions or implementing a multiple-point ignition can narrow down an end gas region, thus suppressing the knocking.

Moreover, the swirl, tumble or the like is caused in an engine for implementing a lean burn having a high specific heat ratio, so as to increase the flame propagation speed. When the above operation is too strong, however, the ignition is sometimes unlikely.

In this respect as well, the laser igniting method which ends the ignition after tens of nano seconds can make a stable ignition.

Concerning the energy required for ignition, the Japanese Patent Application Laid-Open No. Showa 58 (1983)-195071 and the Japanese Patent Application Laid-Open No. Showa 63 (1988)-173852 each propose a technology for improving ignition efficiency by focusing a light in the mixture.

DISCLOSURE OF THE INVENTION

However, the ignition system of each of the Japanese Patent Application Laid-Open No. Showa 58 (1983)-195071 and Japanese Patent Application Laid-Open No. Showa 63 (1988)-173852 implements the mixture ignition in a space, and therefore needs to implement the irradiation by focusing a light beam having a high energy density.

Moreover, when a beam splitter is used, setting of reflection mirrors corresponding to ignition portions is needed in the beam splitter, and focusing lenses as many as the ignition portions are necessary, thus enlarging the system, which is a problem.

Moreover, the intake valve and exhaust valve limit a portion for setting the light generator, which is a problem.

Moreover, despite the above concepts of igniting mixture by means of a light, these use a gas phase reaction by heat energy, thus consuming a great amount of energy during the ignition, which is a problem.

Moreover, adopting the laser igniting method enlarges system structure, thus making it difficult to install the system on the vehicle, which is a problem.

Meanwhile, as another method for improving combustion, fuel reforming is known. In the fuel reforming method, a reformed fuel is supplied to a combustion chamber. The fuel reformed into hydrogen or oxygen-contained compound can effectively enlarge lean limit or decrease soot.

However, the fuel reforming by means of a catalyst reaction had difficulty in controlling temperature.

The present invention has been made in view of the above problems of the conventional technologies. It is an object of the present invention to provide a fuel ignition system for internal combustion engine capable of igniting a lean mixture by means of a light energy which is greatly small in amount. Moreover, it is another object of the present invention to provide a fuel reforming system, a fuel reforming method, a fuel ignition system and a fuel igniting method for internal combustion engine which are capable of suppressing generation of PM (particulate matter) by promoting combustion of mixture.

The present inventors studied hard for accomplishing the above objects. The following operations and the like are implemented: A light energy is irradiated from a light generator to a photocatalyst and the photocatalyst is activated such that a radical necessary for mixture ignition is generated. As a result, the present inventors have found out that the above objects can be accomplished by the above operations, leading to a completion of the present invention. Moreover, the present inventors have found out that allowing a photocatalyst reaction to generate hydrogen or oxygen-contained compound by partly reforming the fuel can solve the above problems, leading to a completion of the present invention.

According to a first aspect of the present invention, there is provided a fuel ignition system for an internal combustion engine, the fuel ignition system adapted to allow a photocatalyst to ignite a mixture by using a light energy irradiated from a light generator, the fuel ignition system comprising: a combustion chamber; the photocatalyst provided in the combustion chamber; and a light generator for flatly irradiating the light energy to the photocatalyst.

According to a second aspect of the present invention, there is provided a fuel igniting method using the fuel ignition system for the internal combustion engine according to the first aspect wherein the fuel ignition system includes two or more types of the photocatalysts disposed in the combustion chamber, at least one type of the two or more types of the photocatalysts absorbs at least a part of a light irradiated from the light generator, to thereby promote a reforming of a fuel, and at least another type of the two or more types of the photocatalysts absorbs at least another part of the light irradiated from the light generator, to thereby promote an igniting of the mixture after the reforming of the fuel, the fuel igniting method comprising: at least one of the following operations: causing a plurality of lights with different single wavelengths, by using a plurality of light generators, and causing a light with a plurality of wavelengths, by varying a light from the light generator through an optical filter; and implementing thereby each of the following operations, by using the lights or the light each having different wavelength areas: reforming the fuel, and igniting the mixture.

According to a third aspect of the present invention, there is provided a fuel reforming system for an internal combustion engine, the fuel reforming system comprising: a photocatalyst provided in a combustion chamber; and a light generator for irradiating a light to the photocatalyst, wherein the fuel reforming system is so configured that the photocatalyst absorbs at least a part of the light irradiated from the light generator to thereby reform a fuel in the combustion chamber.

According to a fourth aspect of the present invention, there is provided a fuel reforming method using the fuel reforming system for the internal combustion engine according to the third aspect, the fuel reforming method comprising: conveying to the combustion chamber a fuel gas which is a mixture of the fuel and an air, to thereby allow the fuel gas to have a contact with the photocatalyst, allowing the photocatalyst to absorb at least the part of the light irradiated from light generator, and reforming the fuel gas into a mixture including at least one of an oxygen-contained compound and a hydrogen.

BRIEF DESCRIPTION OF THE DRAWINGS

FIG. 4(a) and FIG. 4(b) each are a schematic showing a first example of the fuel ignition system for controlling timing of reforming-igniting by the light generator.

BEST MODE FOR CARRYING OUT THE INVENTION

Figure 1:
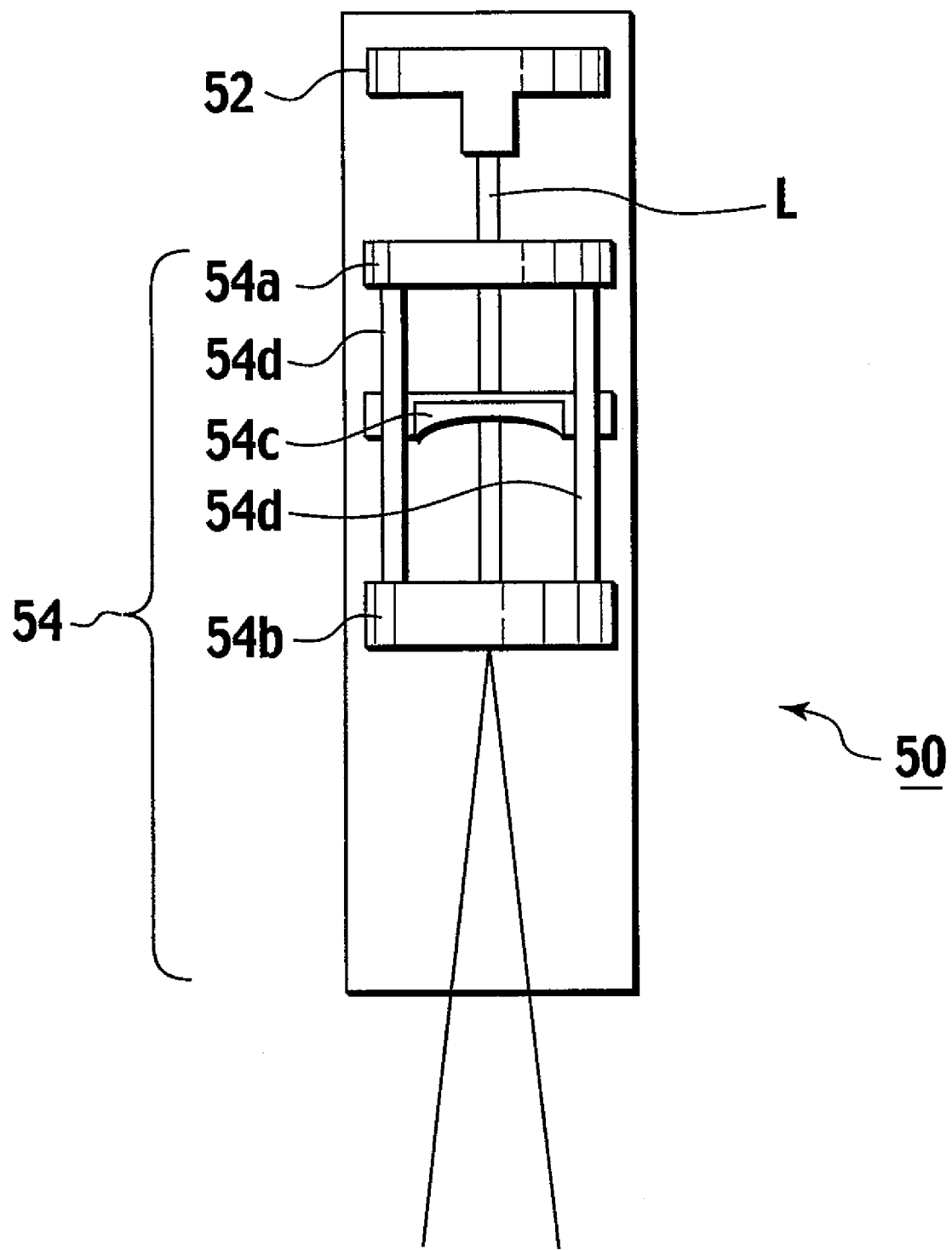
FIG. 1 is an explanatory view showing a schematic cross section of a laser oscillator having an irradiation position varier.

Fuel Ignition System for Internal Combustion Engine

Hereinafter, a fuel ignition system for internal combustion engine under the present invention is to be set forth.

A fuel ignition system for internal combustion engine under the present invention allows a photocatalyst to ignite a mixture, by means of a light energy irradiated from a light generator. The fuel ignition system includes: a combustion chamber, the photocatalyst provided in the combustion chamber, and a light generator for flatly irradiating the light energy to the photocatalyst.

The fuel ignition system having the above structure can generate, for example, HC, $O_2$ radical and the like by reaction of the photocatalyst, making it possible to ignite the mixture by means of a greatly small amount of light energy irradiation.

Moreover, the fuel ignition system for internal combustion engine is capable of improving fuel economy or fuel efficiency with a lean fuel.

Under the present invention, the light generator flatly irradiates the light energy to the photocatalyst.

With the fuel ignition system for internal combustion engine, irradiating the light to the photocatalyst generates electrons and positive holes on a surface of the photocatalyst and the thus generated electrons and positive holes react with the mixture, to thereby generate radicals and ignite the mixture. Therefore, unlike the conventional laser ignition, the fuel ignition system under the present invention does not have a focal point, thus flatly irradiating the light energy and thereby increasing ignition portions formed by the photocatalyst to which the light energy is irradiated. As a result, the combustion can be stabilized.

Moreover, as described above, flatly irradiating the light energy increases the ignition portions, accomplishing a multiple-point ignition. In this case, a plurality of the light generators are not necessarily needed for the multiple-point ignition and a beam splitter is not necessarily needed, thus making the system compact, which is an advantage.

Herein, the "flatly irradiating" is defined as follows: The light energy irradiated by the light generator does not have a focal point in the combustion chamber.

First Embodiment

Moreover, according to a first embodiment of the present invention, the photocatalyst is disposed in the following configuration: With the combustion chamber formed by a cylinder head and a piston head, the photocatalyst is disposed on a piston head face of the piston head, that is, a part of an internal wall face of the combustion chamber.

Specifically, the photocatalyst is applied or vacuum-deposited to the piston head face, or a material for the photocatalyst is used for the piston head per se, thus efficiently advancing reaction of the photocatalyst.

Moreover, under the present invention, with the combustion chamber formed by the cylinder head and the piston head, the following structure is preferable on the piston head face, that is, in a part of the internal wall face of the combustion chamber: A relatively large amount of photocatalysts 20 are provided on a side of a region where the mixture concentration on the piston head face of the piston head is relatively high.

For example, when forming the photocatalyst on the piston head face, the following operation or the like can efficiently ignite the mixture: In the region where the mixture concentration is relatively high, increasing a ratio of coating the photocatalyst's layer on the piston head face.

Herein, the mixture concentration on the piston head face is usually relatively high on a side of an intake port provided in the combustion chamber, that is, a side opposed to an intake valve.

Second Embodiment

Moreover, according to a second embodiment of the present invention, the photocatalyst is disposed in the following configuration: With the combustion chamber formed by the cylinder head and the piston head, an internal wall face of the cylinder head has a first protrusion part and the photocatalyst is provided at the first protrusion part.

With the first protrusion part provided with the above photocatalyst, the mixture is ignitable not only adjacent to the internal wall face of the combustion chamber, i.e., the cylinder head's internal wall face or the piston head face, but also adjacent to a center part of the combustion chamber, thus shortening the flame propagation distance.

As a result, the lean burn can be implemented more stably.

Herein, "the first protrusion part of the internal wall face of the cylinder head" is not specifically limited in terms of scale or form as long as the movement of the intake valve, the exhaust valve and the piston head which are usually provided in the combustion chamber is not inhibited and as long as the first protrusion part is resistant to a high temperature or high pressure condition causing a rapid fluctuation. What is called a jig and the like having the following structure is raised for example: One end of the first protrusion part is fixed to a wall of the fuel chamber, and the first protrusion part is shaped into an alphabetical L so that the photocatalyst can be set in the light irradiation direction.

Third Embodiment

Moreover, disposition of the photocatalyst is to be set forth, according to a third embodiment of the present invention. With the combustion chamber formed by the cylinder head and the piston head, the piston head face of the piston head has a second protrusion part and the photocatalyst is provided at the second protrusion part.

With the thus provided second protrusion part having the above photocatalyst, the mixture is made ignitable not only adjacent to the internal wall face of the combustion chamber, i.e., the cylinder head's internal wall face or the piston head face, but also adjacent to the center part of the combustion chamber, thus shortening the flame propagation distance.

As a result, the lean burn can be more stably implemented, as described above.

Herein, "the second protrusion part of the piston head face" is not specifically limited in terms of scale or form as long as the movement of the intake valve, the exhaust valve and the piston head which are provided in the combustion chamber is not inhibited and as long as the second protrusion part is resistant to a high temperature or high pressure condition causing a rapid fluctuation. For example, the second protrusion part may be a columnar or spindle-like protrusion, otherwise, may be what is called a derrick which is the above columnar or spindle-like protrusion having a proper through hole.

Fourth Embodiment

Moreover, disposition of the photocatalyst is to be set forth, according to a fourth embodiment of the present invention. A meshy carrier having an end part junctioned to an internal wall face of the combustion chamber is disposed in the combustion chamber, and the photocatalyst is provided at the meshy carrier.

With the thus provided meshy carrier having the photocatalyst, the mixture is made ignitable not only adjacent to the internal wall face of the combustion chamber, i.e., the cylinder head's internal wall face or the piston head face, but also adjacent to the center part of the combustion chamber, thus shortening the flame propagation distance.

As a result, the lean burn can be more stably implemented, as described above.

Herein, "the meshy carrier" is not specifically limited in terms of scale or form as long as the movement of the intake valve, the exhaust valve and the piston head which are provided in the combustion chamber is not inhibited and as long as the meshy carrier is resistant to a high temperature or high pressure condition causing a rapid fluctuation. For example, the meshy carrier has an aperture part having such a scale as not to inhibit gas flow in the combustion chamber.

Moreover, under the present invention, a part of the internal wall face of the combustion chamber is so configured as to serve as a mirror face.

With the thus provided combustion chamber's internal wall face serving as a mirror face, the irradiated light energy can be reflected and the thus reflected light energy is irradiated to other parts. Then, disposing the photocatalyst in the other parts can allow, for example, many dispersed portions to serve as ignition portions.

As such, the flame propagation distance can be shortened and the lean burn can be implemented more stably.

Herein, for allowing a part of the internal wall face of the combustion chamber to serve as a mirror face, for example, metal such as aluminum alloy and the like applied to the piston head, the cylinder head, the intake valve's head or the exhaust valve's head should be mirror-finished, but not specifically limited to the above.

Moreover, under the present invention, with the combustion chamber formed by the cylinder head and the piston head, it is preferable that an optical axis direction of the light energy irradiated by the light generator is not parallel with a reciprocating direction of the piston head.

Specifically, an angle formed by the above optical axis direction and the piston head face is preferably acute.

When the optical axis direction is parallel with the reciprocating direction of the piston head, in other words, when the angle formed by the optical axis direction and the piston head face is perpendicular, it is difficult to use, as an ignition portion, an area other than the upper piston head face, that is, the cylinder head's internal wall face and the like. This is not preferable from the view point of shortening the flame propagation distance.

Moreover, under the present invention, with the combustion chamber formed by the cylinder head and the piston head, it is preferable that the light generator flatly irradiates the light energy to an end part of the piston head face.

When the photocatalyst is disposed at the end part of the piston head face, flatly irradiating the light energy as set forth above can ignite the mixture.

Meanwhile, even when the photocatalyst is not disposed at the end part of the piston head face, flatly irradiating the light energy as set forth above can warm the machine since the end part of the piston head face has a relatively low temperature, thus implementing the lean burn more stably.

Moreover, under the present invention, it is preferable that the light generator has an irradiation position adjuster.

Providing the irradiation position adjuster can properly adjust a position for flatly irradiating the light energy, thus implementing the lean burn more stably.

Moreover, under the present invention, with the combustion chamber formed by the cylinder head and the piston head and a temperature sensor for sensing a temperature of the combustion chamber provided; when the temperature sensed by the temperature sensor is less than or equal to a certain temperature, it is preferable that the irradiation position adjuster should adjust the irradiation position such that the light energy is irradiated to the piston head face's end part which is a part of the internal wall face of the combustion chamber.

The above structure can implement the lean burn more efficiently and more stably.

Herein, "the certain temperature" can be properly determined empirically or the like.

Hereinafter, an example of the light generator having an irradiation position adjuster 54 for adjusting the position (region) for flatly irradiating the light energy is to be set forth, referring to drawings.

FIG. 1 is an explanatory view showing a schematic cross section of a laser oscillator 50 having an irradiation position varying unit, i.e., an example of a light generator having the irradiation position adjuster 54.

As shown in FIG. 1, the laser oscillator 50 having the irradiation position varying unit includes a resonant part 52, and the irradiation position varier 54 which is an example of an optical system. The irradiation position varier 54 includes a pair of front and rear transparent glasses 54a, 54b, a concave lens 54c between the front and rear transparent glasses 54a, 54a, and a rod 54d for coupling the above members 54a, 54b, 54c.

In addition, a light L taken out of the resonant part 52 and transmitted in the order of the transparent glass 54a, the concave lens 54c and the transparent glass 54b is irradiated to a photocatalyst (not shown).

In addition, moving the concave lens 54c frontward and rearward in a direction along the rod 54d by means of an actuator (not shown) allows the laser oscillator 50 having the irradiation position varying unit to control the irradiation area of the light energy.

In FIG. 1, the resonant part 52 is disposed adjacent to the irradiation position varier 54. However, the resonant part 52 and the irradiation position varier 54 can be spaced apart since the laser light is transferable by means of, for example, an optical fiber and the like (not shown). Positioning of the resonant part 52 relative to the irradiation position varier 54 is arbitrary.

Figure 2:
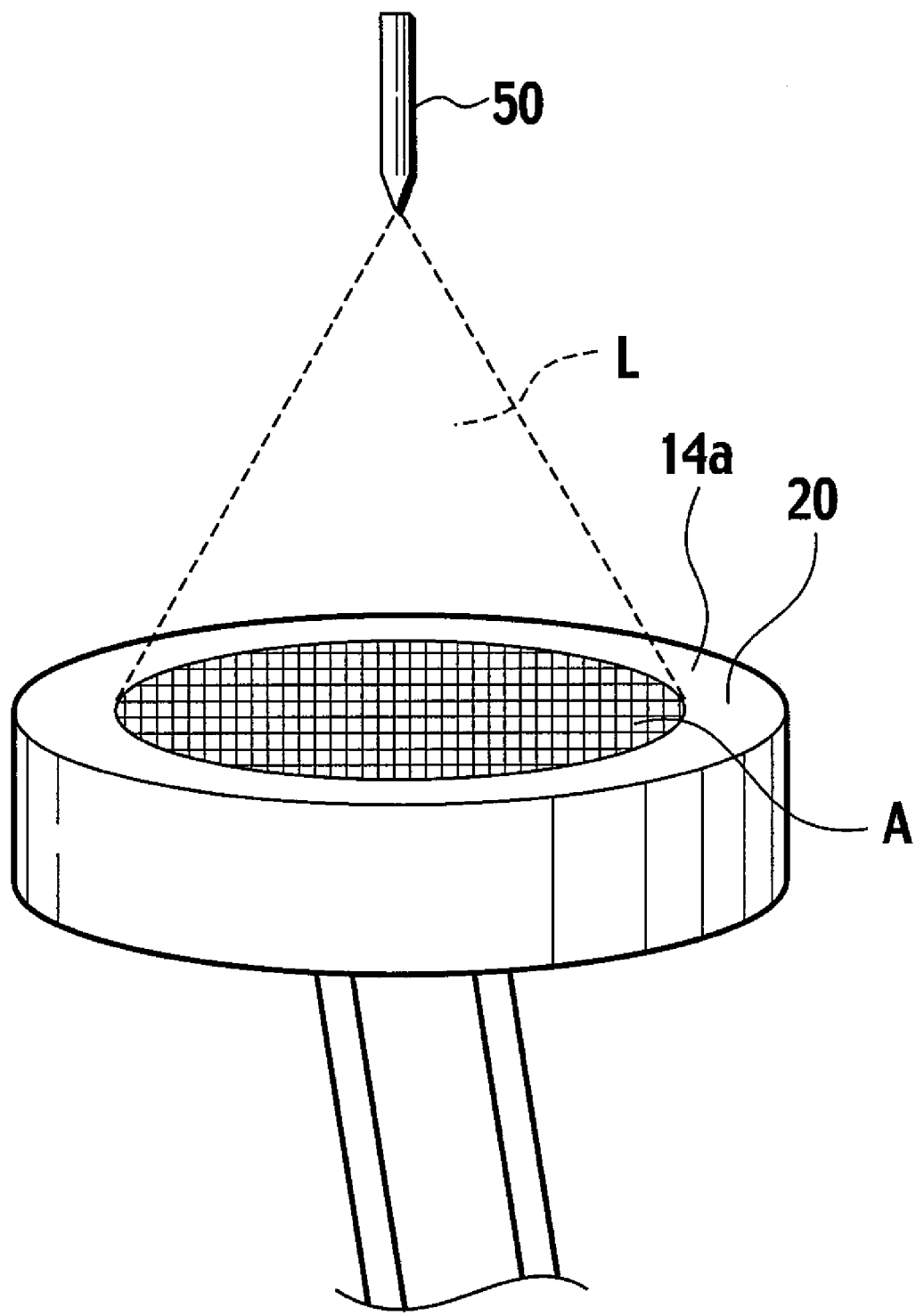
FIG. 2 is an explanatory view showing that the irradiation position varier flatly irradiates a light energy to a piston head face on which a layer of a photocatalyst is formed.

FIG. 2 is an explanatory view showing that, by means of the laser oscillator 50 having the irradiation position varying unit, a light energy is flatly irradiated to a piston head face 14a on which a layer of a photocatalyst 20 is formed.

The light L taken out of the laser oscillator 50 having the irradiation position varying unit is irradiated to the photocatalyst 20 on the piston head face 14a.

Herein, "A" in FIG. 2 denotes an irradiation area.

Moreover, hereinafter, specific elements of the fuel ignition system for internal combustion engine under the present invention are to be set forth.

At first, the internal combustion engine to which the fuel ignition system of the present invention is applied may at least obtain a power through a mixture combustion. Therefore, fuel, operating method, cycle, the number of cylinders, type of cylinder, cooling method, valve mechanism, the number of valves and the like of the internal combustion engine are not specifically limited. The fuel ignition system of the present invention is also applicable to a rotary engine.

Then, the photocatalyst used for the fuel ignition system for internal combustion engine under the present invention is, for example, any of porous titanium series oxide, zinc series oxide, niobium series oxide, tantalum series oxide, tin series oxide, an arbitrary combination thereof and the like, but not specifically limited thereto.

Then, the mixture applied to the fuel ignition system for internal combustion engine under the present invention is not specifically limited, typically, however, is the one obtained by an arbitrary combination of fuel gas (gasoline, light oil, natural gas, alcohol and the like) with air.

Then, the light generator used for the fuel ignition system for internal combustion engine under the present invention is, for example, a laser oscillator.

The laser oscillator varies with type of the combusted mixture, type of photocatalyst and the like, examples thereof including solid laser, gas laser, semiconductor laser, excimer laser, free electron laser and the like, alone or a proper combination thereof.

Moreover, an optical system of the laser oscillator may be the one conventionally known. Herein, a small amount of the light energy can ignite the mixture and therefore a focal point is not made, thus eliminating the need of a focusing lens. For the above reasons and the like, the optical system can be made more compact.

Hereinafter, the present invention is to be set forth more in detail, according to an example 1.

Example 1

Figure 3:
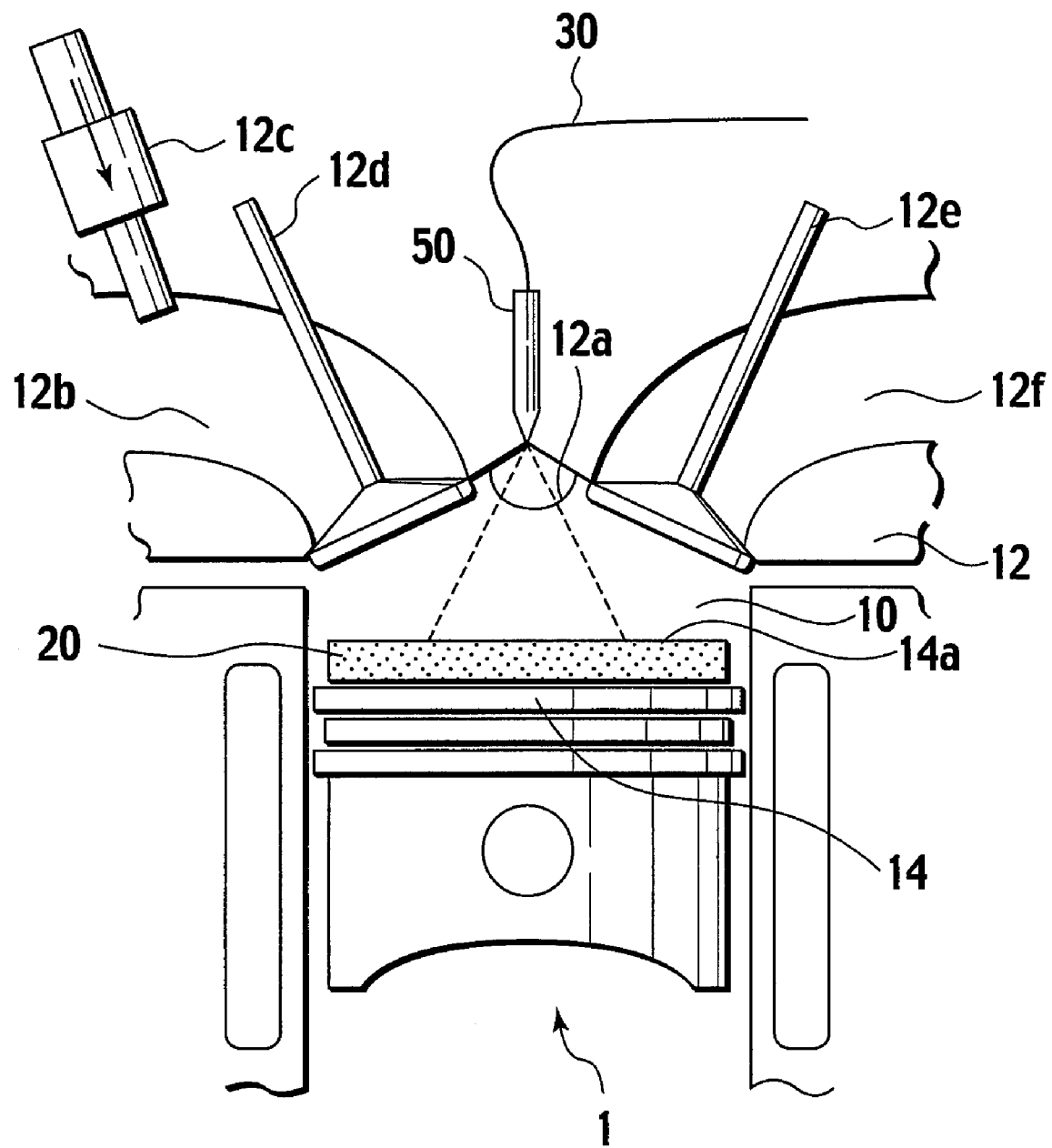
FIG. 3 is an explanatory view showing a schematic cross section of a fuel ignition system for internal combustion engine, according to an example 1.
Figure 5:
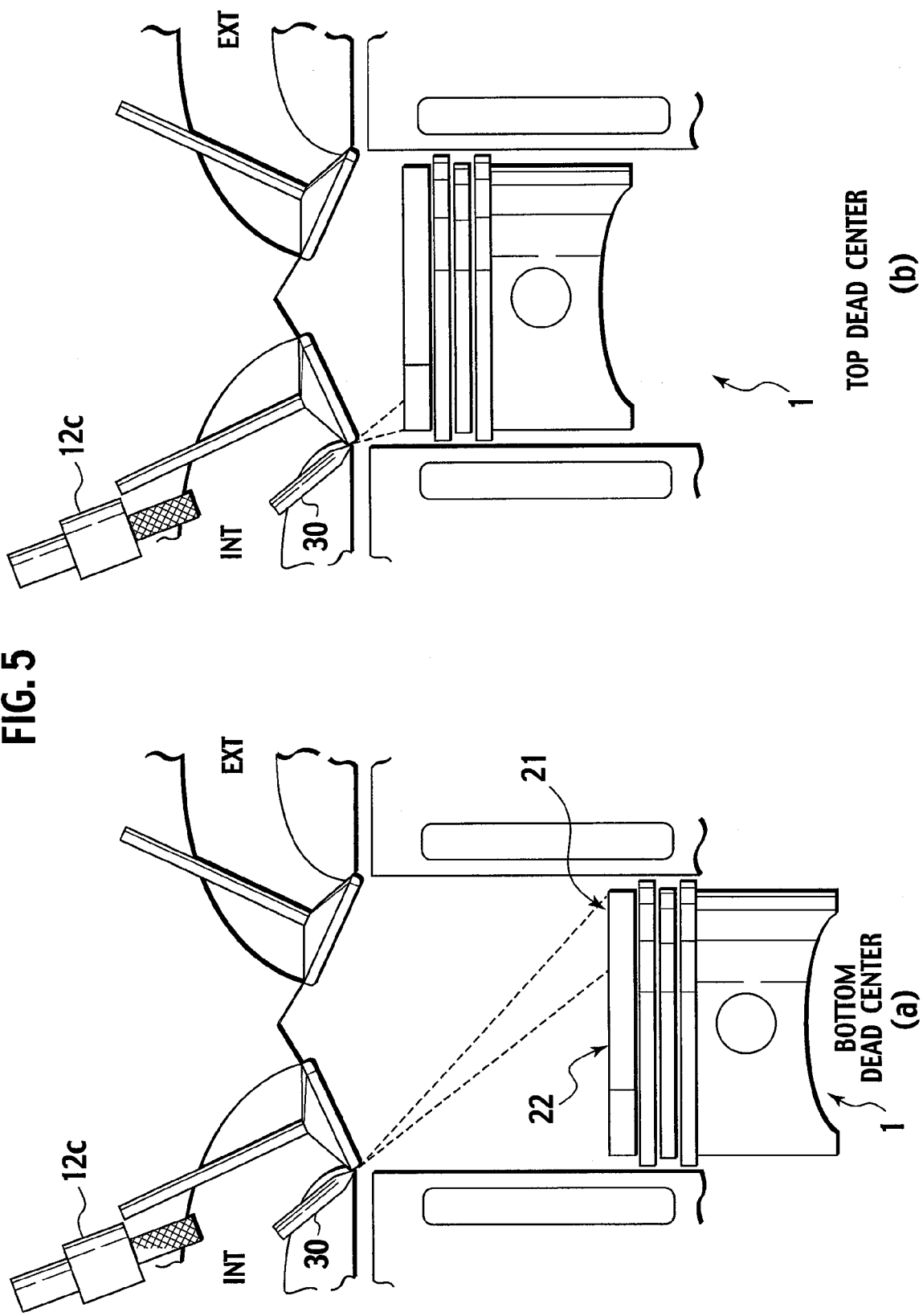
FIG. 5(a) and FIG. 5(b) each are a schematic showing a second example of the fuel ignition system for controlling timing of reforming-igniting by the same light generator.

FIG. 3 is an explanatory view showing a schematic cross section of the fuel ignition system for internal combustion engine, according to an example 1.

As shown in FIG. 3, the fuel ignition system 1 for internal combustion engine according to the example 1 includes: a combustion chamber 10 formed by a cylinder head 12 and a piston head 14, a photocatalyst 20 disposed on the piston head face 14a of the combustion chamber 10, and a laser oscillator 50 which is an example of a light generator 30 for flatly irradiating the light energy to the photocatalyst 20.

Moreover, the cylinder head 12 has a window 12a. The light energy irradiated from the laser oscillator 50 passes through the window 12a, to be irradiated to the photocatalyst 20 as shown in FIG. 2. The photocatalyst 20 to which the light energy is irradiated serves as an ignition portion, thus igniting the mixture in the combustion chamber 10.

Herein, the mixture is obtained from the fuel and an intake air, where the fuel is supplied from an injector 12c disposed at an intake port 12b. Then, with the intake valve 12d opened, the mixture is supplied to the combustion chamber 10. Moreover, after the mixture is combusted, an exhaust valve 12e is opened. Then, from an exhaust gas port 12f, the mixture is exhausted as combustion gas.

As such, use of the photocatalyst 20 allows the mixture to be ignitable with the light energy smaller than that according to the conventional technology, thus accomplishing an ignition in a larger area.

As a result, the combustion is stabilized, accomplishing a lean burn, thus enlarging the lean burn region.

<Fuel Reforming System for Internal Combustion Engine>

Hereinafter, the fuel reforming system for internal combustion engine under the present invention is to be set forth in detail. Herein, in the claims and descriptions, "%" denotes mass percentage unless otherwise specified.

The fuel reforming system for internal combustion engine under the present invention includes the photocatalyst provided in the combustion chamber, and the light generator capable of irradiating the light to the photocatalyst.

As such, allowing the photocatalyst to absorb at least a part of the light irradiated from the light generator can reform the fuel in the combustion chamber.

Varying irradiation conditions can suppress oxidation force of the photocatalyst reaction, thus reforming the fuel into an intermediate product without the need for completely oxidizing the fuel. As such, a mixture including, at a high concentration, an ignitable (likely to be ignited) oxygen-contained compound or an ignitable hydrogen can be filled in the combustion chamber. Moreover, since the fuel reforming is advanced only when the light is irradiated, fuel composition can be properly changed according to an operating state.

Hereinafter described is concerning a reaction mechanism. When a light having an energy more than or equal to a band gap is irradiated to the photocatalyst, an electron is excited from a valence electron band to a conduction band, bringing about a positive hole to the valence electron band. Then, the electron and the positive hole move to the catalyst surface. Then, the electron implements reduction (deoxidization) while the positive hole implements oxidation.

Oxidation-deoxidation force in the above is summarized below. The higher the lower end of the conduction band is, the stronger the deoxidation force is, while the lower the upper end of the valence electron band is, the stronger the oxidation force is.

As such, under the present invention, regulating type of fuel, type of photocatalyst, disposition, amount, wavelength of irradiated light of light generator, photon energy and the like can bring about a desired reformed gas.

Herein, examples of the above reformer photocatalyst include a catalyst where a transition metal such as copper and the like is carried on a porous material such as silica and the like.

When the above are used, oxidation control is facilitated and suppressing the complete oxidation can make it easy to generate the intermediate product.

Moreover, the portion for carrying the photocatalyst is not specifically limited as long as the portion contacts the mixture. From the viewpoint of improving reforming efficiency, however, it is effective to carry the photocatalyst by increasing a specific surface.

For example, a porous inorganic carrier including any of alumina, titania, silica, yttria, zirconia and ceria each having a high specific surface, or an arbitrary combination thereof can be used for carrying the photocatalyst. In this case, in a state of being carried on the porous inorganic carrier, the photocatalyst is preferably disposed on the piston head or on an outer periphery of the cylinder head.

Moreover, the light generator varies with combusted mixture, type of photocatalyst and the like, examples thereof for proper use including those capable of irradiating solid laser, gas laser, semiconductor laser, excimer laser, free electron laser and the like.

Moreover, xenon lamp, halogen lamp, high pressure mercury-vapor lamp and the like can be properly used.

Herein, the fuel (gas) to be reformed is not specifically limited, examples thereof including oxygen-methane, air-gasoline and the like.

Moreover, the above combustion chamber is not specifically limited, examples thereof including the one that is hemispherical, multi-spherical, wedge, bathtub, pent roof or the like which can be used at a desired displacement.

<Fuel Reforming Method>

Then, the fuel reforming method under the present invention is to be set forth in detail.

Using the above fuel reforming system for internal combustion engine, the fuel reforming method includes the following operations: conveying to the combustion chamber the fuel gas which is a mixture of fuel and air, to thereby allow the fuel gas to have a contact with the photocatalyst, allowing the photocatalyst to absorb at least a part of the light irradiated from the light generator, and reforming the fuel gas into a mixture including at least one of an oxygen-contained compound and a hydrogen.

As such, supplying the air to the fuel can reform the fuel to the oxygen-contained compound or hydrogen. Specifically, presence of the oxygen advances a partial oxidation, to thereby generate the oxygen-contained compound.

Examples of the oxygen-contained compound include alcohols such as methanol, ethanol and the like, aldehydes, and the like.

Generating the above oxygen-contained compounds can suppress PM generation in the exhaust gas.

Moreover, in the fuel reforming method, varying the irradiation output of the above light generator can implement each of the following operations: partially oxidizing the fuel and igniting the mixture. That is, increasing the photon amount to be irradiated increases the number of positive holes necessary for the oxidation, thereby increasing reaction speed, resulting in increased reforming amount.

For example, in the internal combustion engine of the automobile and the like, a load fluctuation increases the supplied fuel amount. Corresponding to the thus increased fuel amount, increasing the photon amount, that is, increasing the output is essential.

Moreover, in the fuel reforming method, a spark ignition can ignite the mixture including at least one (reformed gas) of the oxygen-contained compound and the hydrogen.

In this case, a conventional ignition plug and the like can be used irrespective of igniting measure, thus decreasing cost. Herein, examples of types of ignition plug include U recess, protrusion, bipolar, face creepage, wide-U, wide, quadrupolar, resistor-incorporated, racing-purpose and the like.

<Fuel Ignition System for Internal Combustion Engine>

Then, the fuel ignition system for internal combustion engine under the present invention is to be set forth in detail.

The fuel ignition system includes two or more types of photocatalysts disposed in the combustion chamber, and the light generator capable of irradiating the light to the photocatalysts.

The above photocatalysts includes at least one type of each of the followings: the photocatalyst which absorbs at least a part of the light irradiated from the light generator, to thereby promote the reforming of the fuel, and the photocatalyst which absorbs at least a part of the light irradiated from the light generator, to thereby promote the igniting of the mixture after the reforming of the fuel.

Herein, the fuel ignition system for internal combustion engine including only one type of photocatalyst is set forth above, referring to FIG. 2 to FIG. 3.

As such, disposing the photocatalysts having different oxidation forces can control each of the reforming and the igniting, according to the oxidation force of the photocatalyst. As such, the mixture including the reformed gas can be ignited efficiently.

That is, the oxidation-deoxidation force is to be set forth below. The higher the lower end of the conduction band is, the stronger the deoxidation force is, while the lower the upper end of the valence electron band is, the stronger the oxidation force is. Therefore, for controlling the oxidation force, the metal oxides having different positions of the upper end of the valence electron band should be disposed. Moreover, even in the case of the same metal oxide, elevating the position of the valence electron band by doping anion can weaken the oxidation force or adding a transition metal can control activation of the oxidation.

Herein, examples of the above reformer photocatalyst include a catalyst where a transition metal such as copper and the like is carried on a porous material such as silica and the like.

Moreover, other than the photocatalyst such as the above reformer photocatalyst, examples of the above igniter photocatalyst include porous titanium series oxide, zinc series oxide, niobium series oxide, tantalum series oxide, gallium series oxide, strontium series oxide, iron series oxide, tungsten series oxide or tin series oxide, an arbitrary combination thereof and the like.

Specifically, with the combustion chamber formed by the cylinder head's internal wall face and the piston head, the above reformer photocatalyst and igniter photocatalyst can be substantially uniformly dispersed and disposed on the piston head face.

In this case, an entire area of the piston head face can be used for the reforming and igniting. That is, with the piston head face's entire face used for the reforming, the reformed gas can be sufficiently mixed with the mixture, thus improving the combustion. Moreover, with the piston head face's entire face used for the igniting, the flame propagation distance can be shortest, accomplishing an over lean burn or a lean burn. Moreover, a knocking caused by a self-ignition can be suppressed, thus increasing compression ratio.

Herein, the reforming and igniting can be controlled, for example, by switching wavelength of the light to be irradiated.

Moreover, the above igniter photocatalyst and reformer photocatalyst may be disposed distinctly and independently on the piston head face. Typically, disposing the above igniter photocatalysts respectively in a center part and an outer peripheral part of the piston head face while disposing the above reformer photocatalyst between the thus disposed igniter photocatalysts is allowed.

Herein, among the radii of the circle of the piston head face, the "center part" is defined as a range formed by less than or equal to $1/3$ on a center side of the radius while the "outer peripheral part" is defined by a range formed by less than or equal to $1/5$ on a circumference side of the radius.

In this case, disposing the igniter photocatalyst in the center of the piston head face and adjacent to the center can shorten the flame propagation distance in the combustion chamber and disposing the igniter photocatalyst in the outer peripheral part can suppress knocking by the self-ignition, which are effective.

Moreover, the reformer photocatalyst and the igniter photocatalyst are disposed separately. As such, disposing the light generator causing only one type of wavelength is sufficient.

Herein, adjusting the irradiation angle, irradiation range and the like of the light generator can control timing for the reforming and igniting. For example, as shown in FIG. 4(a), FIG. 4(b), FIG. 5(a) and FIG. 5(b), the fuel ignition system 1 is so configured that the upward-downward movement of the piston head allows the light from the light generator to be irradiated to the igniter photocatalyst and the reformer photocatalyst sequentially. Moreover, controlling the wavelength of the irradiated light according to this timing is also effective.

<Fuel Igniting Method>

Then, the fuel igniting method of the present invention is to be set forth in detail.

<<First Fuel Igniting Method>>

In a first fuel igniting method under the present invention, the above fuel ignition system for internal combustion engine implements the following operations: at least one of the following operations: causing a plurality of lights with different single wavelengths, by using a plurality of the light generators, and causing a light with a plurality of wavelengths, by varying the light from the light generator through an optical filter, and implementing thereby each of the following operations, by using the lights or the light each having different wavelength areas: reforming the fuel, and igniting the mixture.

Herein, for advancing the reforming and igniting by means of the photocatalyst, a light having a wavelength having an energy more than or equal to a band gap of each of the photocatalysts should be irradiated. Moreover, irradiating the light having an energy corresponding to the largest band gap of the plurality of the used photocatalysts also allows the photocatalyst having a smaller band gap to absorb the light, thus advancing reactions of both photocatalysts.

Then, disposing the light generator for causing the wavelength absorbed only by the reformer photocatalyst and the wavelength absorbed by the reformer photocatalyst and igniter photocatalyst allows controlling of the reforming-igniting even when various types of photocatalysts are uniformly dispersed. Moreover, in this case, the reforming-igniting is promoted on the entire face of the piston head face, which is effective.

It is sufficient for the optical filter to remove a certain wavelength. For example, a cutoff filter, a neutral density filter and the like can be used which have a combination of a glass plate and a light absorbent. Using the above can pass a light having a long wavelength, while removing a light having a short wavelength. Moreover, combining the above can irradiate a light having a plurality of wavelengths.

<<Second Fuel Igniting Method>>

Moreover, in a second fuel igniting method of the present invention, the above fuel ignition system for internal combustion engine implements the following operations: at least one of the following operations: causing a plurality of lights with different single wavelengths, by using a plurality of the light generators, and varying the irradiation position of the light generator, implementing thereby each of the following operations: reforming the fuel, and igniting the mixture.

In the second fuel igniting method, disposing one type of light generator can promote the reforming and igniting when the reformer photocatalyst is separated from the igniter photocatalyst.

That is, irradiating the light having an energy corresponding to the largest band gap in a plurality of the used photocatalysts allows any of the photocatalysts to absorb the light, thus advancing the photocatalyst reaction.

Moreover, the reforming and igniting can be controlled by, for example, separating wavelength by means of a splitter to thereby vary the irradiation timings independently, or by varying the irradiation positions.

<<Third Fuel Igniting Method>>

Moreover, in a third fuel igniting method of the present invention, the above fuel ignition system for internal combustion engine implements the following operations: varying at least one of the followings of the above light generator: the irradiation time, and irradiation output, and implementing thereby each of the following operations: reforming the fuel, and igniting the mixture.

As such, elongating the irradiation time can secure the reforming amount, for example, in the following case. The activation of the reformer photocatalyst is decreased in occasions such as when the mixture temperature or the piston head face's temperature is low, i.e., during engine start, during a low-load period and the like.

Hereinafter, the present invention is to be set forth more in detail, according to examples 2 to 6 and a comparative example 1. The present invention is, however, not limited to the examples 2 to 6.

Example 2

Figure 6:
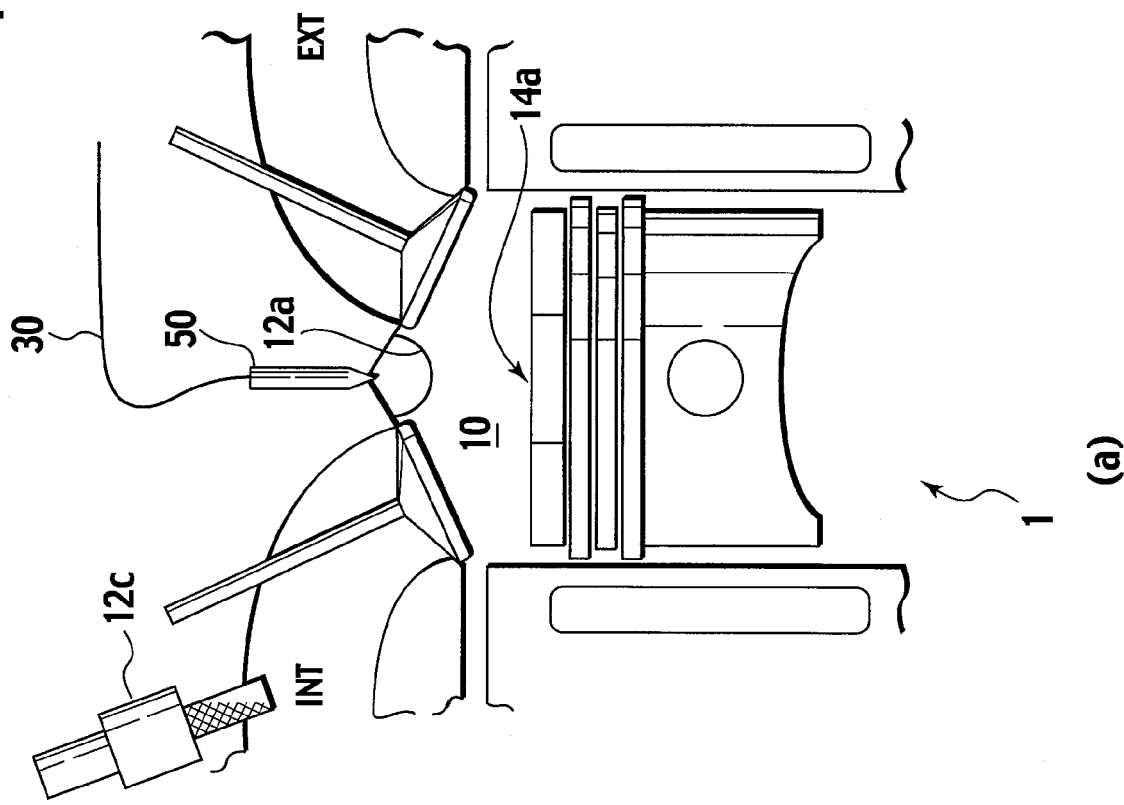
FIG. 6(a) and FIG. 6(b) are schematics of a fuel ignition system and an enlarged piston head face thereof, according to an example 2.

FIG. 6(a) and FIG. 6(b) are respectively a schematic of the fuel ignition system 1 for internal combustion engine and a perspective view of the piston head face 14a.

At an upper part in the combustion chamber 10, the fuel ignition system 1 for internal combustion engine includes a laser oscillator 50 (an example of the light generator 30) and an injector 12c. Moreover, an igniter photocatalyst 22 (Cu/SiO$_2$) is disposed in a center part of the piston head face 14a, while a reformer photocatalyst 21 (TiO$_2$) is disposed in an outer peripheral part (not "less than or equal to ⅕ on a circumference side of the radius" set forth above).

1) Reforming Step (Air Intake Stroke and Compression Stroke) {FIG. 7(a)}

Figure 7:
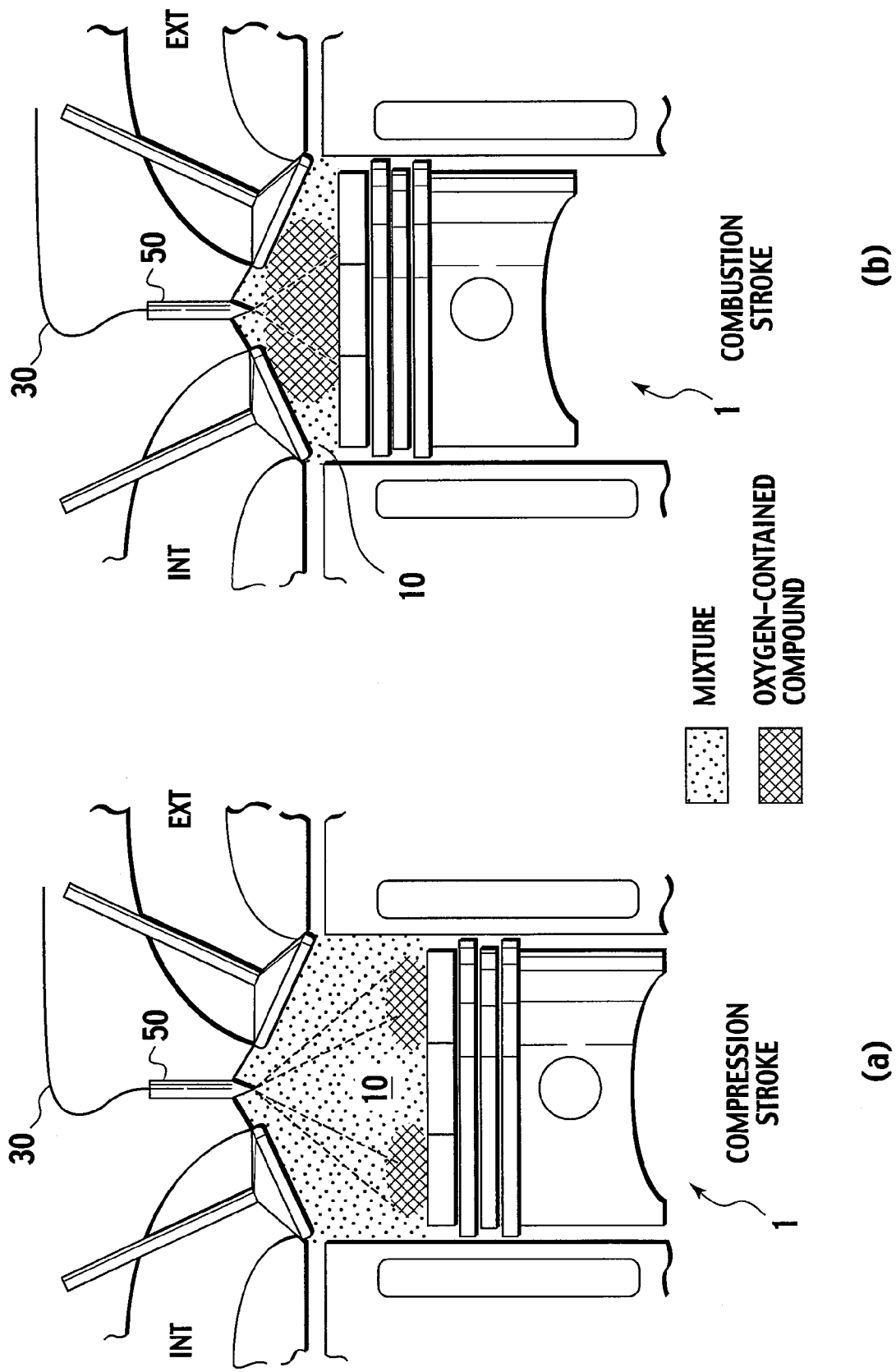
FIG. 7(a) and FIG. 7(b) are schematics showing examples of a compression stroke and a combustion stroke respectively.

The fuel ignition system 1 for internal combustion engine was used for the fuel reforming-igniting, as shown in FIG. 7.

Moreover, the fuel was supplied to the combustion chamber 10 in the oxygen-present state, specifically, in the air intake stroke. Then, from the laser oscillator 50 which is an example of the light generator 30, a light having a wavelength of 450 nm was irradiated to the reformer photocatalyst 21 having a low oxidation force. Thereby, the fuel was reformed and an oxygen-contained compound was generated.

2) Ignition Step (Combustion Stroke) {FIG. 7(b)}

Then, in the combustion chamber 10 having the mixture including the reformed gas; from the laser oscillator 50 which is an example of the light generator 30, a light having a wavelength of 380 nm was irradiated to the igniter photocatalyst 22 having a high oxidation force, to thereby ignite the mixture.

Example 3

Figure 8:
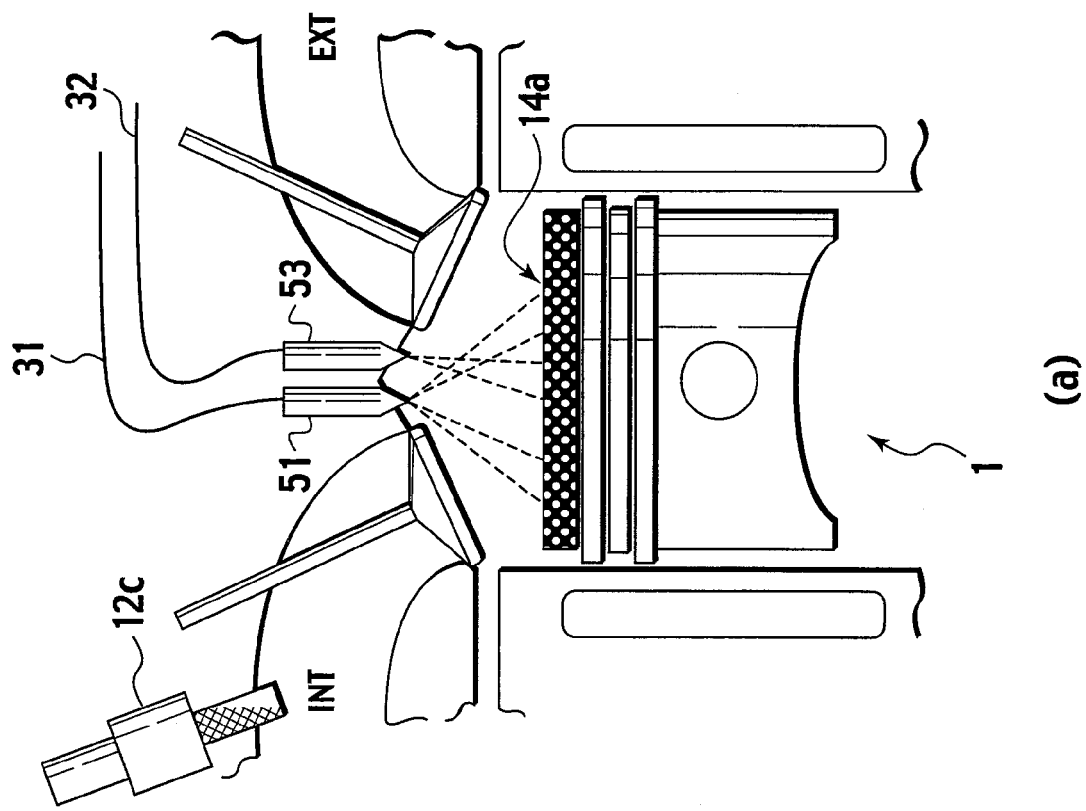
FIG. 8(a) and FIG. 8(b) are schematics of a fuel ignition system and an enlarged piston head face thereof, according to an example 3.

FIG. 8(a) and FIG. 8(b) are respectively a schematic of the fuel ignition system 1 for internal combustion engine and a perspective view of the piston head face 14a.

The fuel ignition system 1 for internal combustion engine according to the example 3 is substantially the same in structure as the that according to the example 2, except: two laser oscillators, that is, a laser oscillator 51 (an example of the light generator 31) and a laser oscillator 53 (an example of the light generator 32) which are capable of irradiating lights having different wavelengths are disposed at an upper part in the combustion chamber 10, and a photocatalyst 23 having a plurality of photocatalysts, that is, the reformer photocatalyst 21 (Cu/SiO$_2$) and the igniter photocatalyst 22 (TiO$_2$) which have different oxidation forces are uniformly mixed is disposed at the piston head face 14a.

In the reforming step (air intake stroke and compression stroke), a light having a wavelength of 450 nm absorbed by the reformer photocatalyst 21 having a low oxidation force was irradiated, to thereby reform the fuel.

Then, in the ignition step (combustion stroke), a light having a wavelength of 380 nm absorbed by the igniter photocatalyst 22 having a high oxidation force was irradiated, to thereby ignite the mixture.

Example 4

Figure 9:
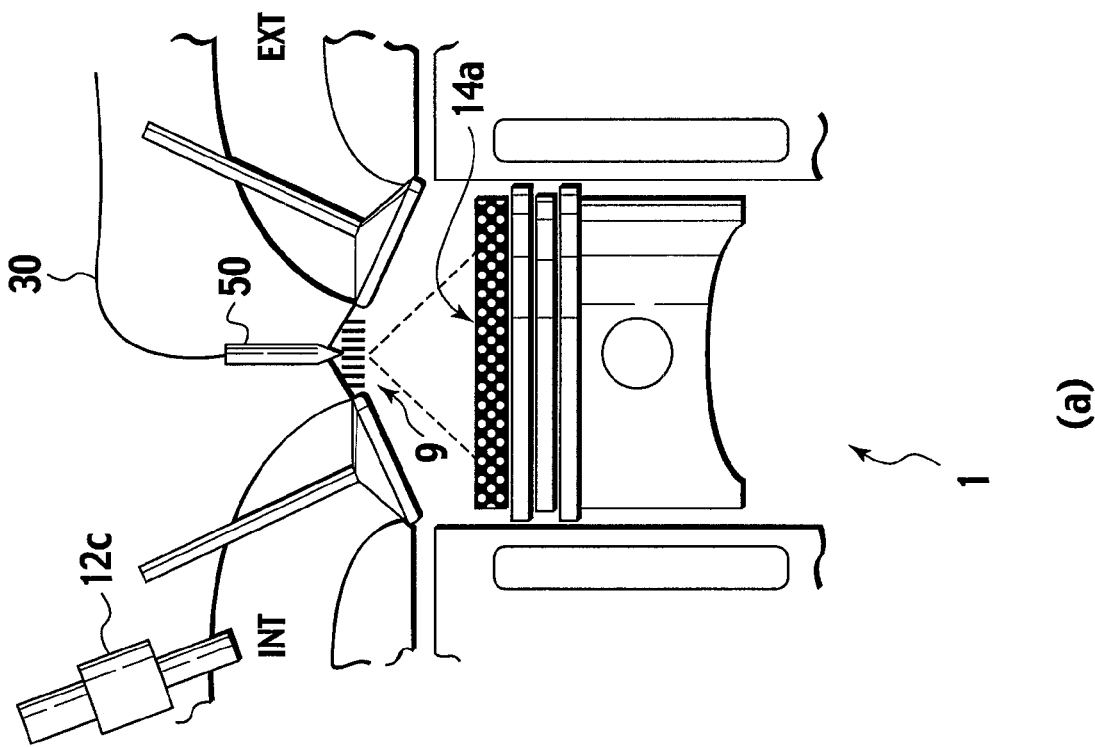
FIG. 9(a) and FIG. 9(b) are schematics of a fuel ignition system and an enlarged piston head face thereof, according to an example 4.

FIG. 9(a) and FIG. 9(b) show schematics of the fuel ignition system 1 for internal combustion engine.

The fuel ignition system 1 for internal combustion engine has such a structure that: the igniter photocatalyst 22 is disposed in the center part and an outer peripheral part of the piston head face 14a, and the reformer photocatalyst 21 is disposed between the igniter photocatalysts 22.

Moreover, a filter 9 for varying wavelengths is disposed at the laser oscillator 50 which is an example of the light generator 30, making it possible to irradiate lights having width wavelengths from 250 nm to 550 nm.

Other than the above, the fuel ignition system 1 for internal combustion engine according to the example 4 is substantially the same in structure as that according to the example 2.

In the reforming step (air intake stroke and compression stroke), a light having a wavelength of 450 nm absorbed by the reformer photocatalyst 21 having a low oxidation force was irradiated, to thereby reform the fuel.

Moreover, a light having a wavelength of 450 nm absorbed by the reformer photocatalyst 21 having a low oxidation force was filtered by the filter 9 and was irradiated, to thereby reform the fuel.

Then, in the ignition step (combustion stroke), a light having a wavelength of 380 nm absorbed by the igniter photocatalyst 22 having a high oxidation force was filtered by the filter 9 and was irradiated, to thereby ignite the mixture.

Example 5

Figure 10:
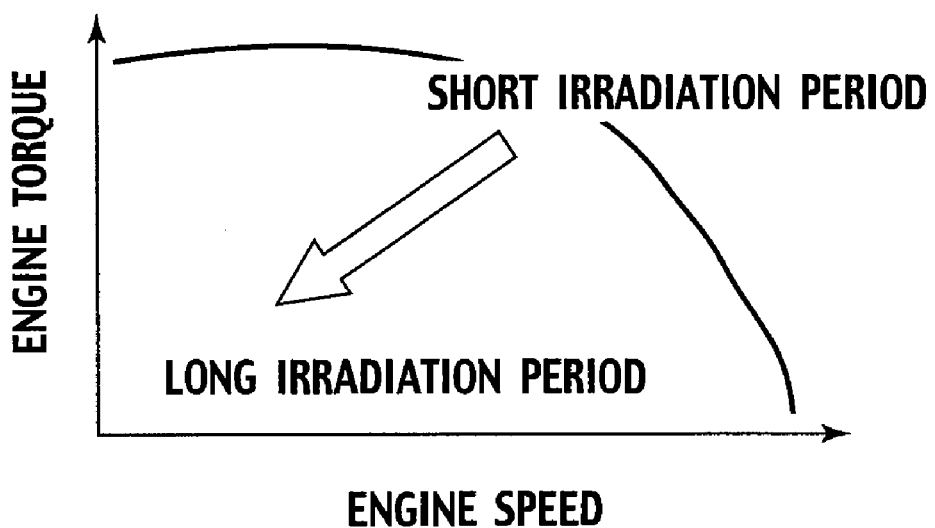
FIG. 10 is a graph showing an operating condition relative to irradiation time, according to an example 5.
Figure 11:
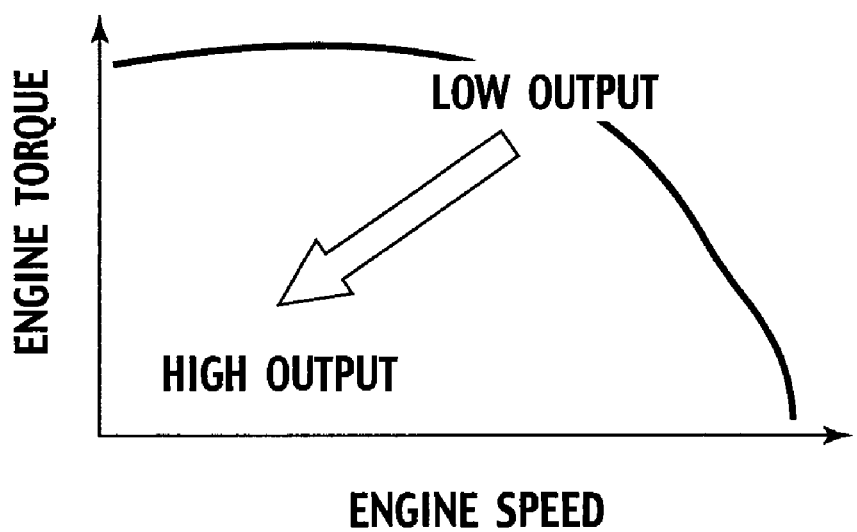
FIG. 11 is a graph showing an operating condition relative to irradiation output, according to an example 5.

As shown in FIG. 10 and FIG. 11, the irradiation time and irradiation output were varied according to the engine speed and engine torque. Other than the above, the fuel ignition system 1 for internal combustion engine according to the example 5 is substantially the same in structure as that according to the example 2.

Example 6

Figure 12:
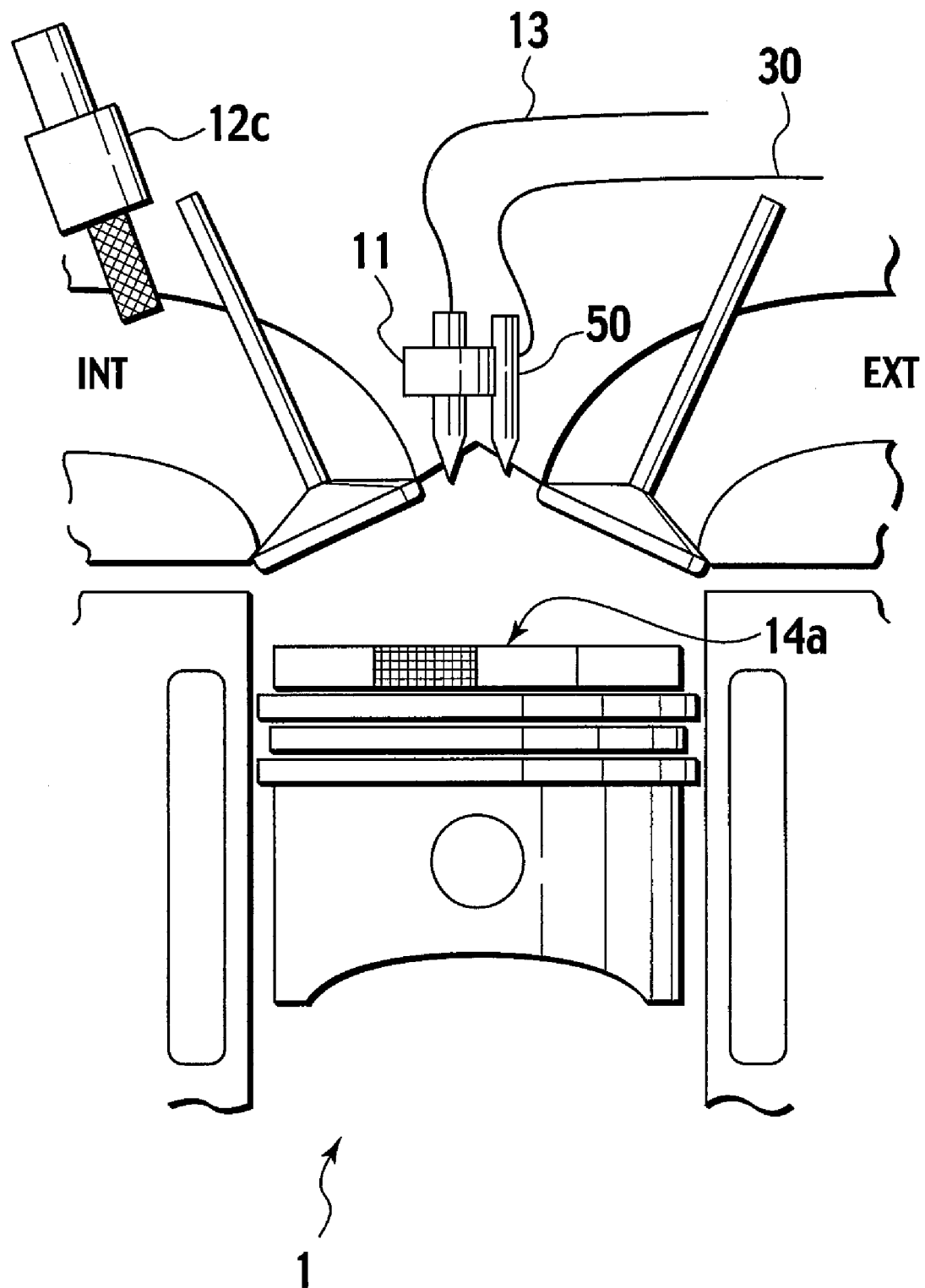
FIG. 12 is a schematic showing a fuel ignition system, according to an example 6.

As shown in FIG. 12, the laser oscillator 50 which is an example of the light generator 30, and an ignition plug 11 connected to a cord 13 were combined. Other than the above, the fuel ignition system 1 for internal combustion engine according to the example 6 is substantially the same in structure as that according to the example 2.

In the reforming step (air intake stroke and compression stroke), a light having a wavelength of 450 μm absorbed by the reformer photocatalyst 21 having a low oxidation force was irradiated, to thereby reform the fuel.

Then, in the ignition step (combustion stroke), the ignition plug 11 could ignite the mixture.

Comparative Example 1

Figure 13:
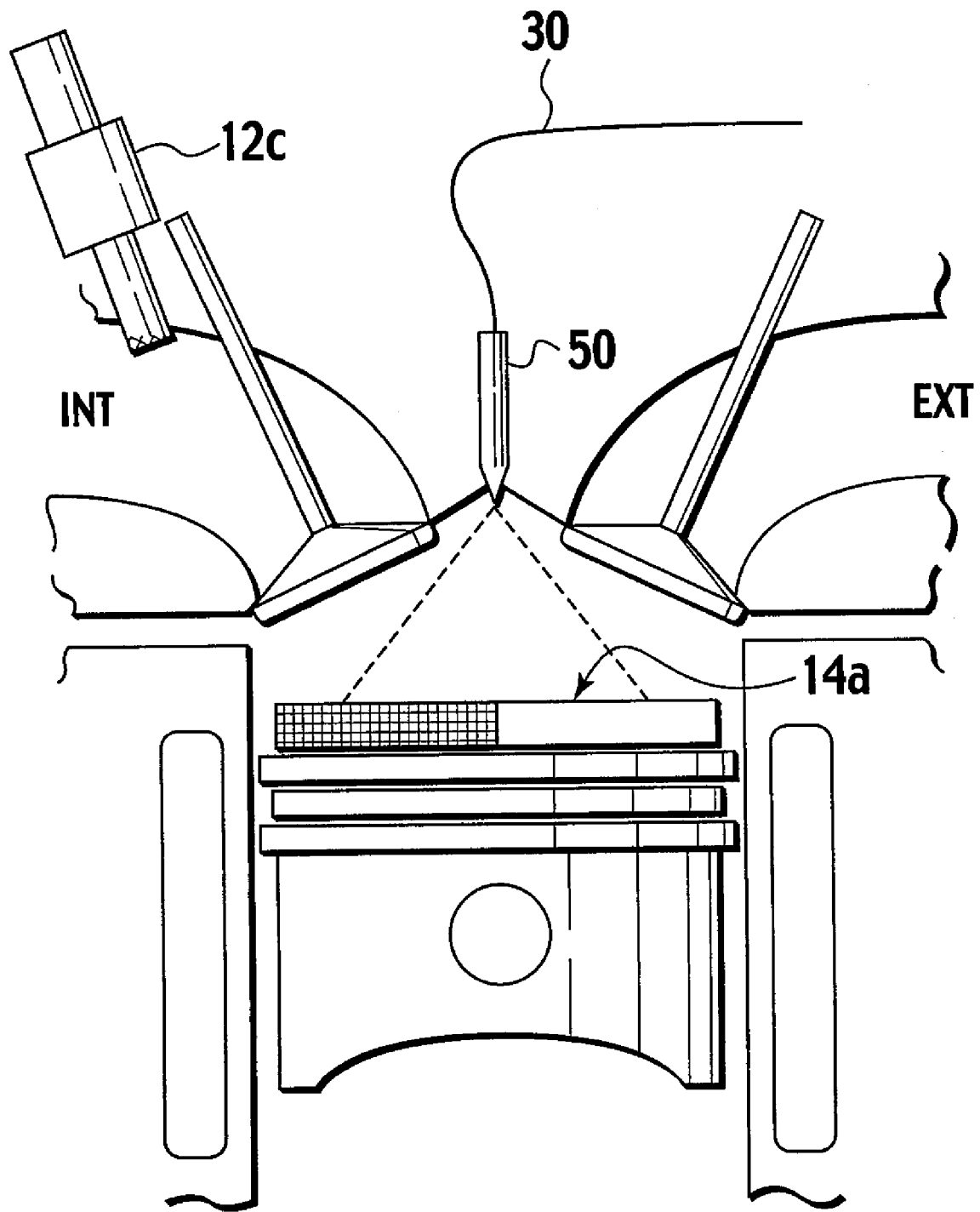
FIG. 13 is a schematic showing a fuel ignition system, according to a comparative example 1.

As shown in FIG. 13, only the igniter photocatalyst 22 ($TiO_2$) for igniting the mixture was disposed on the piston head face 14a. Other than the above, the fuel ignition system 1 for internal combustion engine according to the comparative example 1 is substantially the same in structure as that of the example 2.

(Evaluation and Measurement)

A fuel gas was conveyed to the fuel ignition system 1 for internal combustion engine according to each of the examples 2 to 6 and comparative example 1, to thereby measure PM amount in the exhaust gas after the combustion.

A mixture including gasoline and air which are so regulated as to have an air excessive ratio $\lambda=1$ to 1.5 was supplied.

Compared with the comparative example 1, the examples 2 to 6 show about 20% decrease of the emitted PM amount.

The entire contents of the Japanese Patent Application No. 2005-248708 (filed on Aug. 30, 2005 in Japan) and Japanese Patent Application No. 2005-249383 (filed on Aug. 30, 2005 in Japan) are incorporated herein by reference.

Although the present invention has been described according to the above embodiments and examples, the present invention is not limited thereto. It is obvious to a person skilled in the art that various changes or modifications are allowed.

INDUSTRIAL APPLICABILITY

Under the present invention, a light energy is irradiated from a light generator to a photocatalyst to thereby activate the photocatalyst. Then, a radical necessary for mixture ignition is generated by reaction of the photocatalyst. Thereby, a fuel ignition system for internal combustion engine capable of igniting a lean mixture by means of a greatly small amount of light energy can be provided, and a fuel ignition system for internal combustion engine capable of improving fuel economy by a lean burn can be provided.

Moreover, under the present invention, the reaction of the photocatalyst reforms a part of fuel to thereby generate hydrogen or oxygen-contained compound. This promotes combustion of mixture, thus suppressing generation of PM (particulate matter).

The invention claimed is:

1. A fuel ignition system for an internal combustion engine, the fuel ignition system being adapted to allow a photocatalyst to ignite a mixture by using a light energy irradiated from a light generator, the fuel ignition system comprising:
    a combustion chamber;
    the photocatalyst provided in the combustion chamber; and
    the light generator for flatly irradiating the light energy to the photocatalyst,
    wherein the light generator has an irradiation position adjuster,
    wherein the combustion chamber is formed by a cylinder head and a piston head,
    wherein the combustion chamber further includes a temperature sensor for sensing a temperature of the combustion chamber, and
    wherein, when the temperature sensed by the temperature sensor is less than or equal to a certain temperature, the irradiation position adjuster adjusts an irradiation position such that the light energy is irradiated to an end part of a piston head face of the piston head.

2. The fuel ignition system for the internal combustion engine according to claim 1, wherein the photocatalyst is provided on the piston head face of the piston head.

3. The fuel ignition system for the internal combustion engine according to claim 1, wherein a relatively large amount of the photocatalyst is photocatalysts are provided on a side of a region where a concentration of the mixture on the piston head face of the piston head is relatively high.

4. The fuel ignition system for the internal combustion engine according to claim 1, wherein an internal wall face of the cylinder head has a first protrusion part, and wherein the photocatalyst is provided at the first protrusion part.

5. The fuel ignition system for the internal combustion engine according to claim 1, wherein the piston head face of the piston head has a second protrusion part, and wherein the photocatalyst is provided at the second protrusion part.

6. The fuel ignition system for the internal combustion engine according to claim 1, wherein a meshy carrier having an end part junctioned to an internal wall face of the combustion chamber is disposed in the combustion chamber, and wherein the photocatalyst is provided at the meshy carrier.

7. The fuel ignition system for the internal combustion engine according to claim 1, wherein a part of an internal wall face of the combustion chamber is so configured as to serve as a mirror face.

8. The fuel ignition system for the internal combustion engine according to claim 1, wherein an optical axis direction of the light energy flatly irradiated by the light generator is not in parallel with a reciprocating direction of the piston head.

9. A fuel ignition system for an internal combustion engine, the fuel ignition system being adapted to allow a photocatalyst to ignite a mixture by using a light energy irradiated from a light generator, the fuel ignition system comprising:
    a combustion chamber;
    the photocatalyst provided in the combustion chamber; and
    the light generator for flatly irradiating the light energy to the photocatalyst,
    wherein the fuel ignition system includes two or more types of the photocatalysts disposed in the combustion chamber,
    wherein at least one type of the two or more types of the photocatalysts is a reformer photocatalyst configured to absorb at least a part of a light irradiated from the light generator, to thereby promote a reforming of a fuel, and
    wherein at least another type of the two or more types of the photocatalysts is an igniter photocatalyst configured to absorb at least another part of the light irradiated from the light generator, to thereby promote an igniting of the mixture after the reforming of the fuel.

10. The fuel ignition system for the internal combustion engine according to claim 9, wherein the combustion chamber is formed by a cylinder head and a piston head, and wherein the reformer photocatalyst and the igniter photocatalyst are substantially uniformly dispersed and disposed on a piston head face of the piston head.

11. The fuel ignition system for the internal combustion engine according to claim 9, wherein the combustion chamber is formed by a cylinder head and a piston head, and wherein the igniter photocatalyst and the reformer photocatalyst are disposed distinctly and independently at a piston head face of the piston head.

12. The fuel ignition system for the internal combustion engine according to claim 11, wherein a first portion of the igniter photocatalyst is disposed in a center part of the piston head face and a second portion of the igniter photocatalyst is disposed in an outer peripheral part of the piston head face, and
wherein the reformer photocatalyst is disposed between the first portion of the igniter photocatalyst and the second portion of the igniter photocatalyst.

13. A fuel igniting method using the fuel ignition system for the internal combustion engine according to claim 9, the fuel igniting method comprising:
at least one of the following operations:
causing a plurality of lights with different single wavelengths, by using a plurality of light generators, and
causing a light with a plurality of wavelengths, by varying a light from the light generator through an optical filter; and
implementing thereby each of the following operations, by using the plurality of lights or the light with the plurality of wavelengths:
reforming the fuel, and
igniting the mixture.

14. A fuel igniting method using the fuel ignition system for the internal combustion engine according to claim 11, the fuel igniting method comprising:
at least one of the following operations:
causing a plurality of lights with different single wavelengths, by using a plurality of light generators, and
varying an irradiation position of the light generator; and
implementing thereby each of the following operations:
reforming the fuel, and
igniting the mixture.

15. A fuel igniting method using the fuel ignition system for the internal combustion engine according to claim 9, the fuel igniting method comprising:
varying at least one of the following of the light generator:
an irradiation time, and
an irradiation output; and
implementing thereby each of the following operations:
reforming the fuel, and
igniting the mixture.

16. A fuel reforming method using a fuel reforming system for an internal combustion engine, wherein the fuel reforming system comprises: a photocatalyst provided in a combustion chamber, and a light generator for irradiating a light to the photocatalyst, wherein the fuel reforming system is configured such that the photocatalyst absorbs at least a part of the light irradiated from the light generator such that a fuel in the combustion chamber is reformed, the fuel reforming method comprising:
conveying to the combustion chamber a fuel gas which is a mixture of the fuel and air, to thereby allow the fuel gas to have a contact with the photocatalyst;
allowing the photocatalyst to absorb at least the part of the light irradiated from the light generator; and
reforming the fuel gas into a mixture including at least one of an oxygen-contained compound and a hydrogen,
varying an irradiation output of the light generator such that each of the following operations is implemented:
partially oxidizing the fuel, and
igniting the mixture.

17. The fuel reforming method according to claim 16, wherein a spark ignition ignites the mixture including the at least one of the oxygen-contained compound and the hydrogen.

* * * * *